United States Patent
Okamatsu et al.

(10) Patent No.: US 9,527,996 B2
(45) Date of Patent: Dec. 27, 2016

(54) THERMOSETTING RESIN COMPOSITION

(71) Applicant: THE YOKOHAMA RUBBER CO., LTD., Minato-Ku, Tokyo (JP)

(72) Inventors: Takahiro Okamatsu, Hiratsuka (JP); Ryota Takahashi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/779,787

(22) PCT Filed: Mar. 24, 2014

(86) PCT No.: PCT/JP2014/058033
§ 371 (c)(1),
(2) Date: Sep. 24, 2015

(87) PCT Pub. No.: WO2014/157063
PCT Pub. Date: Oct. 2, 2014

(65) Prior Publication Data
US 2016/0053109 A1    Feb. 25, 2016

(30) Foreign Application Priority Data

Mar. 26, 2013 (JP) ................................. 2013-064556

(51) Int. Cl.
| | |
|---|---|
| *C08L 63/00* | (2006.01) |
| *C08L 63/02* | (2006.01) |
| *C08L 63/04* | (2006.01) |
| *C08F 8/30* | (2006.01) |
| *C08G 59/40* | (2006.01) |
| *C08G 59/56* | (2006.01) |
| *C08L 101/02* | (2006.01) |
| *C09J 163/00* | (2006.01) |

(52) U.S. Cl.
CPC .................. *C08L 63/00* (2013.01); *C08F 8/30* (2013.01); *C08G 59/40* (2013.01); *C08G 59/56* (2013.01); *C08L 63/04* (2013.01); *C08L 101/02* (2013.01); *C09J 163/00* (2013.01); *C08L 2207/04* (2013.01)

(58) Field of Classification Search
None
See application file for complete search history.

(56) References Cited

U.S. PATENT DOCUMENTS

| | | | | |
|---|---|---|---|---|
| 3,985,709 | A | * | 10/1976 | Saltman .................. C08C 19/22 524/248 |
| 7,125,934 | B1 | * | 10/2006 | Parker .................. B60C 1/0016 525/331.9 |
| 8,883,931 | B2 | | 11/2014 | Cinar et al. |
| 2014/0031500 | A1 | | 1/2014 | Matsumura et al. |

FOREIGN PATENT DOCUMENTS

| | | |
|---|---|---|
| JP | 2011-057946 A | 3/2011 |
| JP | 2011-506650 A | 3/2011 |
| JP | 2012-158738 A | 8/2012 |
| JP | 2012-219222 A | 11/2012 |
| JP | 2012-219223 A | 11/2012 |
| JP | 2013-32471 A * | 2/2013 |
| JP | 2013-032471 A | 2/2013 |

OTHER PUBLICATIONS

Tada et al., "Modification of Butadiene Rubber with 1,3-Dipolar Cycloaddition Reaction. I. Preparation and Properties of the Modified Polybutadiene", Journal of Applied Polymer Science, vol. 15, 1971 pp. 117-128.*

* cited by examiner

*Primary Examiner* — Robert Sellers
(74) *Attorney, Agent, or Firm* — Carrier Blackman & Associates, P.C.; Joseph P. Carrier; Anne G. Sabourin

(57) ABSTRACT

The invention provides a thermosetting resin composition that demonstrates superior peel strength while retaining excellent heat resistance and tensile shear adhesion strength. The thermosetting resin composition comprises: an epoxy resin A containing an epoxy group and a thermoplastic resin B containing a functional group f having reactivity with an epoxy group, the thermoplastic resin B being obtained by modifying a thermoplastic resin b1 containing an unsaturated bond with a nitrone b2 containing the functional group f, and the content of the nitrone b2 relative to the unsaturated bonds being not less than 0.5 mol % and less than 10 mol %, and the content of the thermoplastic resin B being from 10 to 50 parts by mass per 100 parts by mass of the epoxy resin A.

12 Claims, No Drawings

THERMOSETTING RESIN COMPOSITION

TECHNICAL FIELD

The present invention relates to a thermosetting resin composition.

BACKGROUND

Conventionally, thermosetting resin compositions containing an epoxy resin have been widely used in a variety of fields as adhesives for bonding adherends. For example, Patent Documents 1 and 2 describe epoxy resin compositions that use specified urethane resins and rubber-modified epoxy resins in combination with epoxy resin.

PRIOR ART DOCUMENT

Patent Document

Patent Document 1: Japanese Unexamined Patent Application Publication No. 2012-219222A
Patent Document 2: Japanese Unexamined Patent Application Publication No. 2012-219223A

SUMMARY OF THE INVENTION

Problem to be Solved by the Invention

Epoxy resin has excellent heat resistance and tensile shear adhesion strength, but its peel strength is insufficient.

When the present inventors examined the thermosetting resin compositions (epoxy resin compositions) described in Patent Documents 1 and 2, they saw no improvement in peel strength.

Thus, an object of the present invention is to provide a thermosetting resin composition that demonstrates superior peel strength while retaining excellent heat resistance and tensile shear adhesion strength.

Means to Solve the Problem

The present inventors have conducted dedicated research to achieve the above object. As a result, they discovered that by blending a specified content of specified thermoplastic resins in epoxy resin, peel strength can be improved while retaining excellent heat resistance and tensile shear adhesion strength, and thereby achieved the present invention.

Specifically, the present invention provides the following (1) to (5).

(1) A thermosetting resin composition comprising: an epoxy resin A containing an epoxy group and a thermoplastic resin B containing a functional group f having reactivity with an epoxy group, the thermoplastic resin B being obtained by modifying a thermoplastic resin b1 containing an unsaturated bond with a nitrone b2 containing the functional group f, and a content of the nitrone b2 relative to the unsaturated bonds being not less than 0.5 mol % and less than 10 mol %, and a content of the thermoplastic resin B being from 10 to 50 parts by mass per 100 parts by mass of the epoxy resin A.

(2) The thermosetting resin composition according to (1) above, wherein the functional group f is a nitrogen-containing group having reactivity with an epoxy group.

(3) The thermosetting resin composition according to (2) above, wherein the functional group f which is the nitrogen-containing group is an imidazole residue.

(4) The thermosetting resin composition according to any one of (1) to (3) above, wherein the thermoplastic resin b1 is a diene rubber component.

(5) The thermosetting resin composition according to any one of (1) to (4) above, further comprising a curing agent C containing a functional group having reactivity with an epoxy group.

Effect of the Invention

By the present invention, a thermosetting resin composition that demonstrates superior peel strength while retaining excellent heat resistance and tensile shear adhesion strength can be provided.

BEST MODE FOR CARRYING OUT THE INVENTION

Thermosetting Resin Composition

The thermosetting resin composition of the present invention (also referred to simply as "composition of the present invention" hereinafter) is a thermosetting resin composition comprising: an epoxy resin A containing an epoxy group and a thermoplastic resin B containing a functional group f having reactivity with an epoxy group, the thermoplastic resin B being obtained by modifying a thermoplastic resin b1 containing an unsaturated bond with a nitrone b2 containing the functional group f, and the content of the nitrone b2 relative to the unsaturated bonds being not less than 0.5 mol % and less than 10 mol %, and the content of the thermoplastic resin B being from 10 to 50 parts by mass per 100 parts by mass of the epoxy resin A.

Each component contained in the composition of the present invention will be described in detail below.

Epoxy Resin A

The epoxy resin A is not particularly limited provided that it is a compound containing two or more epoxy groups in the molecule. One such compound may be used alone, or two or more types may be used in combination.

Examples of the epoxy resin A include bifunctional glycidyl ether epoxy resins such as epoxy compounds containing a bisphenyl group, such as bisphenol A-type, bisphenol F-type, brominated bisphenol A-type, hydrogenated bisphenol A-type, bisphenol S-type, bisphenol AF-type, and biphenyl-type epoxy compounds; polyalkylene glycol-type and alkylene glycol-type epoxy compounds; epoxy compounds containing a naphthalene ring; epoxy compounds containing a fluorene group; and the like.

Other examples of the epoxy resin (A) include polyfunctional glycidyl ether epoxy resins such as phenol novolac-type, ortho-cresol novolac-type, trishydroxyphenylmethane-type, and tetraphenylolethane-type; glycidyl ester-type epoxy resins of synthetic fatty acids such as dimer acids; aromatic epoxy resins containing a glycidyl amino group such as N,N,N',N'-tetraglycidyldiaminodiphenylmethane (TGDDM), tetraglycidyl-m-xylylenediamine, triglycidyl-p-aminophenol, and N,N-diglycidylaniline; epoxy compounds containing a tricyclodecane ring (epoxy compounds obtained by a method of manufacturing in which dicyclopentadiene and a cresol such as m-cresol or a phenol are polymerized, and then reacted with epichlorohydrin); and the like.

Bisphenol A-type epoxy resins, bisphenol F-type epoxy resins, urethane-modified epoxy resins, rubber-modified epoxy resins, and the like can be advantageously employed as the epoxy resin A.

The epoxy equivalent weight of bisphenol A-type epoxy resin is preferably in the range of 180 to 300 g/eq. Specifically, bisphenol A-type epoxy resins may be selected as appropriate from the jER series (827, 828, 834, and the like) manufactured by Japan Epoxy Resin Co., Ltd., the EPICLON series (840, 850, and the like) manufactured by DIC Corporation, the Adeka Resin EP-4100 series manufactured by Adeka Corporation, and the like.

The epoxy equivalent weight of bisphenol F-type epoxy resin is preferably in the range of 150 to 200 g/eq. Specifically, bisphenol F-type epoxy resins may be selected as appropriate from the jER series (806, 807, and the like) manufactured by Japan Epoxy Resin Co., Ltd., the EPICLON series (830, 835, and the like) manufactured by DIC Corporation, the Adeka Resin EP-4900 series manufactured by Adeka Corporation, and the like.

Urethane-modified epoxy resins are not particularly limited provided that they contain a urethane bond and two or more epoxy groups in the molecule. Specifically, urethane-modified epoxy resins may be selected as appropriate from the epoxy series (803, 802-30CX, 820-40CX, 834, and the like) manufactured by Mitsui Chemicals, Inc., the Adeka Resin EPU series manufactured by Adeka Corporation, and the like.

Rubber-modified epoxy resins are not particularly limited provided that they are epoxy resins containing two or more epoxy groups in the molecule in which the backbone is rubber. Examples of backbone-forming-rubber include polybutadiene, acrylonitrile butadiene rubber (NBR), carboxyl-terminated NBR (CTBN), and the like. Specifically, rubber-modified epoxy resins may be selected as appropriate from the EPR series manufactured by Adeka Corporation and the like.

Thermoplastic Resin B

The thermoplastic resin (B) is a thermoplastic resin containing a functional group f having reactivity with an epoxy group, and is, generally, obtained by modifying a thermoplastic resin b1 having an unsaturated bond using a specified content of nitrone b2 containing the functional group f.

Due to containing such a thermoplastic resin B in combination with the epoxy resin A, the composition of the present invention can have improved peel strength while retaining excellent heat resistance and tensile shear adhesion strength.

The reason for this is not clear but is surmised to be as follows. Specifically, it is thought that in the composition of the present invention, the nitrone portion derived from a specified content of the nitrone b2 bonds the interface between the epoxy resin A and the thermoplastic resin B, and the epoxy resin A and the thermoplastic resin B exist in a mutually phase-separated state. Therefore, it is thought that the composition of the present invention exhibits excellent peel strength due to the thermoplastic resin B phase present in the epoxy resin (A) exhibiting resistance force against peeling, while retaining the high glass transition temperature and excellent tensile shear adhesion strength derived from the epoxy resin A.

Each component that constitutes the thermoplastic resin B, a manufacturing method thereof, and the like will be described below.

Thermoplastic Resin b1

The thermoplastic resin b1 used for obtaining the thermoplastic resin B is not particularly limited provided that it is an unmodified thermoplastic resin containing an unsaturated bond between carbons and can be modified with a nitrone b2 through a modification mechanism to be described later.

Note that in the present invention, "unmodified" refers to a state that is not modified with a nitrone, and does not exclude modification with other components.

Examples of such an unmodified thermoplastic resin b1 include diene rubber components, specific examples of which include natural rubber, isoprene rubber, butadiene rubber, 1,2-polybutadiene, chloroprene rubber, butyl rubber, styrene butadiene rubber, nitrile rubber (acrylonitrile rubber and hydrogenated nitrile rubber), ethylene propylene diene rubber, and the like. One type of these may be used alone, or two or more types may be used in combination.

Among these, butadiene rubber (polybutadiene) is preferred, and polybutadiene polyol containing two or more hydroxy groups is more preferred, due to having a low glass transition temperature and flexibility.

The number average molecular weight of the thermoplastic resin b1 is not particularly limited, and is, for example, from 500 to 5000, and is preferably from 1000 to 3500. The number average molecular weight is that measured by a method conforming to ASTM D 2503.

Nitrone b2

The nitrone b2 used to modify the thermoplastic resin b1 is a nitrone containing a functional group f having reactivity with an epoxy group. Note that "nitrone" is a generic term for compounds in which an oxygen atom is bonded to a nitrogen atom of a Schiff base.

Examples of the functional group f include nitrogen-containing groups having reactivity with an epoxy group, specifically a primary amino group, a primary amino group protected by a leaving group, a substituted amino group, an amide group, an imino group, an imidazole residue, a nitrile group, a pyridyl group, and the like. Advantageous examples of the leaving group include a trimethylsilyl group, a 2,2,5,5-tetramethyl-(1-aza-2,5-disilacyclopentan)-1-yl group, and the like.

Among these, an amino group, an amide group, an imino group, and an imidazole residue are preferred as the functional group f, and an imidazole residue is more preferred, because they have high reactivity as a curing agent of the epoxy resin A.

The term "imidazole residue" can mean an imidazole group but can also refer to a group in which one hydrogen atom has been eliminated from an imidazole derivative. Examples of imidazole derivatives include imidazole, 2-methylimidazole, 2-ethylimidazole, 2-ethyl-4-methylimidazole, 4-methylimidazole, 2-phenylimidazole, 2-phenyl-4-methylimidazole, 1-benzyl-2-methylimidazole, 1-benzyl-2-ethyl-5-methylimidazole, 2-phenyl-3-methyl-5-hydroxymethylimidazole, and the like.

The nitrone b2 is not particularly limited provided that it is a nitrone containing at least one of the above functional groups f, and examples are the nitrones represented by formula (b2-1) below.

Formula 1

(b2-1)

In formula (b2-1), X and Y each independently represent the functional group f or aliphatic or aromatic hydrocarbon groups optionally containing a substituent, and at least one of X and Y represents the above functional group f.

The functional group f indicated by X and Y is as described above.

Examples of aliphatic hydrocarbon groups represented by X and Y include alkyl groups, cycloalkyl groups, alkenyl groups, and the like.

Examples of the alkyl group include a methyl group, ethyl group, n-propyl group, isopropyl group, n-butyl group, isobutyl group, sec-butyl group, tert-butyl group, n-pentyl group, isopentyl group, neopentyl group, tert-pentyl group, 1-methylbutyl group, 2-methylbutyl group, 1,2-dimethylpropyl group, n-hexyl group, n-heptyl group, n-octyl group, and the like. Among these, alkyl groups having from 1 to 18 carbons are preferable, and alkyl groups having from 1 to 6 carbons are more preferable.

Examples of the cycloalkyl group include a cyclopropyl group, cyclobutyl group, cyclopentyl group, cyclohexyl group, and the like. Among these, cycloalkyl groups having from 3 to 10 carbons are preferable, and cycloalkyl groups having from 3 to 6 carbons are more preferable.

Examples of the alkenyl group include a vinyl group, 1-propenyl group, allyl group, isopropenyl group, 1-butenyl group, 2-butenyl group, and the like. Among these, alkenyl groups having from 2 to 18 carbons are preferable, and alkenyl groups having from 2 to 6 carbons are more preferable.

Examples of the aromatic hydrocarbon group represented by X and Y include aryl groups, aralkyl groups, and the like.

Examples of the aryl group include a phenyl group, naphthyl group, anthryl group, phenanthryl group, biphenyl group, and the like. Among these, aryl groups having from 6 to 14 carbons are preferable, aryl groups having from 6 to 10 carbons are more preferable, and a phenyl group and a naphthyl group are even more preferable.

Examples of the aralkyl group include a benzyl group, phenethyl group, phenylpropyl group, and the like. Among these, aralkyl groups having from 7 to 13 carbons are preferable, aralkyl groups having from 7 to 11 carbons are more preferable, and a benzyl group is even more preferable.

Furthermore, the aromatic hydrocarbon group may have a hetero atom. Examples thereof include a furan group, a thiophene group, and the like.

The substituent that may be included in the hydrocarbon group represented by X and Y is not particularly limited. Examples thereof include lower alkyl groups having from 1 to 4 carbons, a hydroxyl group, a carboxyl group, a carbonyl group, a carbonate group, a urethane group, a sulfonyl group, an alkoxy group, an ester group, a halogen atom, and the like.

Note that examples of the aromatic hydrocarbon group containing such a substituent include aryl groups containing a substituent, such as a tolyl group and xylyl group; aralkyl groups containing a substituent, such as a methylbenzyl group, ethylbenzyl group, and methylphenethyl group; and the like.

In the nitrone b2 represented by formula (b2-1), at least one of X and Y in formula (b2-1) may be the above functional group f, but from the viewpoint of ease of synthesis, it is preferable that only one of either X or Y is the functional group f, and more preferable that only Y is the functional group f.

The method for synthesizing the nitrone b2 is not particularly limited, and a conventionally known method may be used. For example, nitrones containing a nitrone group represented by the formula —N$^+$(—O$^-$)=CH— are obtained by stirring a compound containing a hydroxyamino group (—NHOH) and a compound containing an aldehyde group (—CHO) at a molar ratio of 1.5:1 to 1:1.5 in the presence of an organic solvent (e.g. methanol, ethanol, tetrahydrofuran, and the like) at room temperature for 1 to 24 hours to allow the two compounds to react.

Method of Manufacturing Thermoplastic Resin B (Modification Mechanism)

The method of manufacturing the thermoplastic resin B is not particularly limited, and a conventionally known method may be used. An example is a method of obtaining the thermoplastic resin B by mixing the unmodified thermoplastic resin b1 having an unsaturated bond and the nitrone b2 containing the functional group f at 100 to 200° C. for 1 to 30 minutes.

At this time, a cycloaddition reaction occurs between an unsaturated bond contained in the thermoplastic resin b1 and the nitrone group contained in the nitrone b2 to form a five-membered ring as illustrated in formula (1) or formula (2) below.

Formula 2

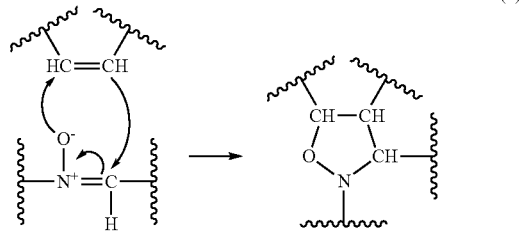

(1)

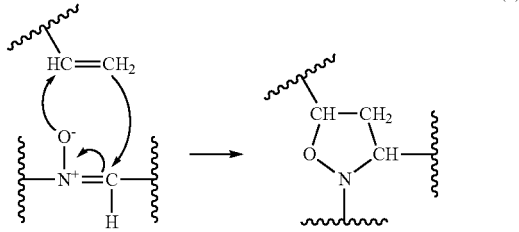

(2)

Content of Nitrone b2 Relative to Unsaturated Bonds of Thermoplastic Resin b1

The thermoplastic resin B is manufactured by the method described above or the like, but at that time, in the present invention, the content of the nitrone b2, which reacts with the unmodified thermoplastic resin b1, is not less than 0.5 mol % and less than 10 mol % relative to the content of unsaturated bonds in the thermoplastic resin b1.

When the content of the nitrone b2 is less than 0.5 mol % relative to the content of unsaturated bonds, not only does peel strength not improve, but tensile shear adhesion strength also decreases.

On the other hand, when the content of the nitrone b2 is not less than 10 mol % relative to the content of unsaturated bonds, the thermoplastic resin B ends up dissolving in the epoxy resin A, and the glass transition temperature, which serves as an indicator of heat resistance, decreases. Tensile shear adhesion strength also decreases.

However, when the content of the nitrone b2 is within the above range, peel strength can be improved while retaining excellent heat resistance and tensile shear adhesion strength.

From the perspectives of both performance and economy, the content of the nitrone b2 is preferably from 0.5 to 8 mol %, and more preferably from 0.5 to 5 mol %, relative to the unsaturated bonds of the thermoplastic resin b1.

Advantageous Mode of Thermoplastic Resin B

The thermoplastic resin B is obtained by modifying the unmodified thermoplastic resin b1 with the nitrone b2.

Since a five-membered ring structure is formed in this modification as described based on formulas (1) and (2) above, the thermoplastic resin B preferably has a five-membered ring structure derived from the nitrone b2 and represented by formula (B-1) and/or formula (B-2) below. In formulas (B-1) and (B-2), X and Y are the same as the X and Y in formula (b2-1) described above.

Formula 3

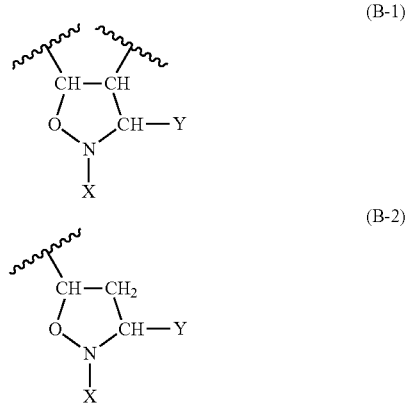

(B-1)

(B-2)

Content of Thermoplastic Resin B

In the composition of the present invention, the content of the thermoplastic resin B is from 10 to 50 part by mass relative to 100 parts by mass of the epoxy resin A.

When the content of the thermoplastic resin B is too low, the improvement in peel strength is insufficient and the tensile shear adhesion strength also decreases. On the other hand, when the content of the thermoplastic resin B is too high, the glass transition temperature, which serves as an indicator of heat resistance, decreases, and the tensile shear adhesion strength also decreases.

However, when the content of the thermoplastic resin B is within the above range, peel strength can be improved while retaining excellent heat resistance and tensile shear adhesion strength.

From the perspectives of both shear adhesion strength and peel strength as well as heat resistance, the content of the thermoplastic resin B is preferably from 10 to 30 parts by mass, and more preferably from 10 to 20 parts by mass, relative to 100 parts by mass of the epoxy resin A.

Curing Agent C

The composition of the present invention may also contain a curing agent C containing a functional group having reactivity with an epoxy group. Here, the functional group contained in the curing agent C is exemplified by those described for the functional group f.

Examples of such a curing agent C include aromatic amines such as diaminodiphenylmethane and diaminodiphenylsulfone, aliphatic amines, imidazole derivatives such as 4-methylimidazole, dicyandiamide, tetramethylguanidine, thiourea-addition amines, carboxylic anhydrides such as methylhexahydrophthalic anhydride, carboxylic acid hydrazide, carboxylic acid amide, polyphenol compounds, novolac resin, polymercaptane, and the like. One type of these may be used alone, or two or more types may be used in combination.

Among these, diaminodiphenylmethane, imidazole derivatives, and dicyandiamide are preferred because adhesiveness is superior.

From the perspective of adhesion performance, the content of the curing agent C in the composition of the present invention is preferably from 3 to 30 parts by mass, and more preferably from 5 to 30 parts by mass, relative to 100 parts by mass of the epoxy resin A.

Other Additives and the Like

The composition of the present invention may also contain additives as necessary in addition to the components described above, within a range that does not impair the object of the present invention. Examples of the additives include plasticizers, fillers, reactive diluents, curing catalysts, thixotropy-imparting agents, silane coupling agents, pigments, dyes, anti-aging agents, antioxidants, antistatic agents, flame retardants, drying oils, adhesiveness-imparting agents, dispersing agents, dehydrating agents, ultraviolet absorbers, solvents, and the like. One type of these may be used alone, or two or more types may be used in combination.

Method of Manufacturing and the Like of Thermosetting Resin Composition

The method of manufacturing the thermosetting resin composition of the present invention is not particularly limited, and may be, for example, a method of obtaining the thermosetting resin composition by uniformly mixing the above-described mandatory components and optional components using a conventionally known apparatus.

The method of using the composition of the present invention is not particularly limited, and may be, for example, one of applying it to a desired adherend and heating at 100 to 200° C. for 1 to 6 hours to cure.

Applications of Thermosetting Resin Composition

Because the composition of the present invention exhibits superior peel strength, it can be used advantageously as, for example, a structural adhesive. Here, the expression "structural adhesive" is taken to mean an adhesive (JIS K 6800) that has high reliability and little decrease in bonding characteristics even when a load is applied over a long time interval. For example, the composition of the present invention may be used as an adhesive for structural components of automobiles or railroad cars (bullet train cars and railroad cars), civil construction, building construction, electronics, aircraft, and space industry applications. In particular, the composition of the present invention may be advantageously used as an adhesive for automotive structures such as automobiles and railroad cars (e.g. bullet train cars and railroad cars) and an adhesive for vehicle structures.

Furthermore, other than structural adhesives, the composition of the present invention may be used as an adhesive for general office work, medical care, carbon fiber, and electronic materials, and the like. Examples of adhesives for electronic materials include interlayer adhesives of multilayer substrates such as build-up substrates, adhesives for binding optical parts, adhesives for assembling optical disks, adhesives for mounting printed circuit boards, die bonding adhesives, adhesives for semiconductors such as underfill, and mounting adhesives such as BGA reinforcement underfill, anisotropic conductive film (ACF), anisotropic conductive paste (ACP), and the like.

In addition to being used as an adhesive, the composition of the present invention may be used in articles for general applications in which thermosetting resin such as epoxy resin is used. Examples include coating materials, coating agents, molding materials (including sheets, films, FRP, and the like), insulating materials (including printed circuit boards, wire covering, and the like), sealants, sealing agents for flat panel displays, fiber bundling agents, and the like.

EXAMPLES

The present invention is described in detail below using working examples but is in no way restricted to these examples.

Synthesis of Imidazole Nitrone

Imidazole-4-carboxyaldehyde represented by formula (3) below (35 g) and ethanol (10 mL) were put in a 300-mL eggplant-shaped flask, and then a solution in which phenylhydroxylamine represented by formula (2) below (43.65 g) was dissolved in ethanol (70 mL) was added and stirred at room temperature for 22 hours. After the completion of stirring, imidazole nitrone represented by formula (4) below was obtained by recrystallization from ethanol.

Formula 4

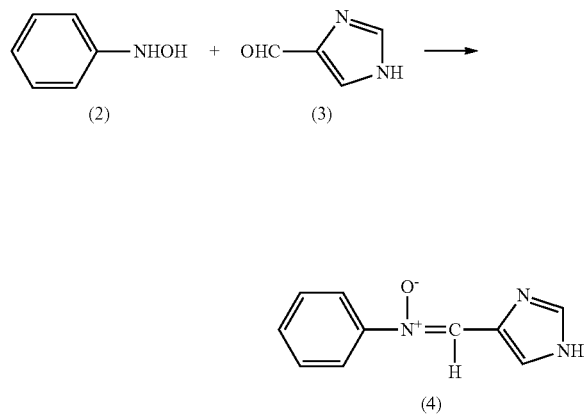

Synthesis of Thermoplastic Resin

Synthesis Examples 1 to 6

The components shown in Table 1 below were blended in a Banbury mixer at 150° C. in the proportions (parts by mass) shown in the same table. They were mixed for 10 minutes to synthesize a thermoplastic resin in which unmodified thermoplastic resin 1 or 2 had been modified with imidazole nitrone.

The term "modification rate" in Table 1 is the content of imidazole nitrone (units: mol %) relative to the content of unsaturated bonds in the unmodified thermoplastic resin 1 or 2.

TABLE 1

| | Synthesis Example | | | | | |
|---|---|---|---|---|---|---|
| | 1 | 2 | 3 | 4 | 5 | 6 |
| Unmodified thermoplastic resin 1 | 100 | 100 | 100 | | | |
| Unmodified thermoplastic resin 2 | | | | 100 | 100 | 100 |

TABLE 1-continued

| | Synthesis Example | | | | | |
|---|---|---|---|---|---|---|
| | 1 | 2 | 3 | 4 | 5 | 6 |
| Imidazole nitrone | 2.26 | 4.53 | 45.2 | 2.34 | 4.68 | 46.8 |
| Modification rate (mol %) | 0.5 | 1.0 | 10.0 | 0.5 | 1.0 | 10.0 |

The details of each component shown in Table 1 above are as follows.
Unmodified thermoplastic resin 1: R15HT (polybutadiene polyol, number average molecular weight: 1200; manufactured by Idemitsu Kosan Co., Ltd.)
Unmodified thermoplastic resin 2: R45HT (polybutadiene polyol, number average molecular weight: 2800; manufactured by Idemitsu Kosan Co., Ltd.)
Imidazole nitrone: Imidazole nitrone synthesized as described above Preparation of Thermosetting Resin Composition Blending Examples 1 to 18

Next, the components shown in Table 2 below were blended in the proportions (parts by mass) shown in the same table, uniformly mixed, and the thermosetting resin compositions of the blending examples (referred to simply as "compositions" hereinafter) were prepared. The prepared compositions of the blending examples were evaluated as follows. The results are shown in Table 2 below.
Glass Transition Temperature (Tg)
Using a differential scanning calorimetry (DSC) device (DSC823e, manufactured by Mettler-Toledo International, Inc.), the glass transition temperature (units: ° C.) was measured by heating each of the compositions of the blending examples from −130° C. to 40° C. at a heating rate of 10° C./min. A composition with a higher glass transition temperature can be evaluated as superior in heat resistance.
Tensile Shear Adhesion Strength
Using a 2-mm-thick aluminum sheet (JIS A 5054) as an adherend, the composition of each of the blending examples was cured by heating at 150° C. for 6 hours (200° C. for 2 hours only for Blending Example 15 which used curing agent 2), and tensile shear adhesion strength (units: MPa) was measured at a tensile speed of 50 mm/min at 25° C. in conformance with JIS K 6850:1999. A composition with a higher measured value can be evaluated as superior in tensile shear adhesion strength.
As the failure mode, cohesive failure was designated as "CF," and interfacial peeling was designated as "AF." If the failure mode is "CF," the composition can be evaluated as superior in tensile shear adhesion strength.
Peel Strength
Using a 0.5-mm-thick aluminum sheet (JIS A 1004) as an adherend, the composition of each of the blending examples was cured by heating at 150° C. for 6 hours (200° C. for 2 hours only for Blending Example 15 which used curing agent 2), and peel strength (units: N/25 mm) was measured at a tensile speed of 50 mm/min at 25° C. in conformance with the T-type peel strength testing method of JIS K 6854-3:1999. A composition with a higher measured value can be evaluated as superior in peel strength.
As the failure mode, 50% cohesive failure was designated as "CF50," and interfacial peeling was designated as "AF." If the failure mode is "CF50," the composition can be evaluated as superior in peel strength.

TABLE 2

Table 2-1

| | Blending Examples | | | | | | | | |
|---|---|---|---|---|---|---|---|---|---|
| | 1 Working Example | 2 Comparative Example | 3 Working Example | 4 | 5 | 6 | 7 Comparative Example | 8 | 9 |
| Epoxy resin 1 | 100 | ← | ← | ← | ← | ← | ← | ← | ← |
| Thermoplastic resin of Synthesis Example 1 | 10 | | | | | | | | |
| Thermoplastic resin of Synthesis Example 2 | | 10 | | | | | 9.5 | | |
| Thermoplastic resin of Synthesis Example 3 | | | 10 | | | | | | |
| Thermoplastic resin of Synthesis Example 4 | | | | 10 | | | | | |
| Thermoplastic resin of Synthesis Example 5 | | | | | 10 | | | | |
| Thermoplastic resin of Synthesis Example 6 | | | | | | 10 | | | |
| Unmodified thermoplastic resin 1 | | | | | | | | 10 | |
| Unmodified thermoplastic resin 2 | | | | | | | | | 10 |
| Heat reversible rubber Y1 | | | | | | | | | |
| Curing agent 1 | 15 | ← | ← | ← | ← | ← | ← | ← | ← |
| Curing agent 2 | | | | | | | | | |
| Curing agent 3 | | | | | | | | | |
| Glass transition temperature (° C.) | 130 | 131 | 101 | 130 | 128 | 89 | 130 | 132 | 128 |
| Tensile shear adhesion strength (MPa) | 14.0 | 13.5 | 10.0 | 12.0 | 12.5 | 9.1 | 10.0 | 10.0 | 9.6 |
| Failure mode | CF | CF | CF | CF | CF | CF | CF | AF | AF |
| Peel strength (N/25 mm) | 2.1 | 2.4 | 2.3 | 2.8 | 3.1 | 2.1 | 1.9 | 1.1 | 1.1 |
| Failure mode | CF50 | CF50 | CF50 | CF50 | CF50 | CF50 | AF | AF | AF |

TABLE 3

Table 2-2

| | Blending Examples | | | | | | | | |
|---|---|---|---|---|---|---|---|---|---|
| | 10 Working Example | 11 Comparative Example | 12 Working Example | 13 Comparative Example | 14 | 15 Working Example | 16 | 17 | 18 Comparative Example |
| Epoxy resin 1 | ← | ← | ← | ← | ← | ← | ← | ← | Commercially available adhesive |
| Thermoplastic resin of Synthesis Example 1 | 20 | | 50 | 75 | | | | | |

TABLE 3-continued

Table 2-2

| | Blending Examples | | | | | | | |
|---|---|---|---|---|---|---|---|---|
| | 10 Working Example | 11 Comparative Example | 12 Working Example | 13 Comparative Example | 14 | 15 Working Example | 16 | 17 | 18 Comparative Example |
| Example 2 Thermoplastic resin of Synthesis Example 3 | | 20 | | | | | | | |
| Thermoplastic resin of Synthesis Example 4 | | | | | | 10 | 20 | | |
| Thermoplastic resin of Synthesis Example 5 | | | | | | | | | |
| Thermoplastic resin of Synthesis Example 6 | | | | | | | | | |
| Unmodified thermoplastic resin 1 | | | | | | | | | |
| Unmodified thermoplastic resin 2 | | | | | | | | | |
| Heat reversible rubber Y1 | | | | | | | | 20 | |
| Curing agent 1 | ← | ← | ← | ← | ← | | | 15 | |
| Curing agent 2 | | | | | | 7 | | | |
| Curing agent 3 | | | | | | | 27 | | |
| Glass transition temperature (° C.) | 129 | 95 | 127 | 115 | 135 | 189 | 170 | 135 | 130 |
| Tensile shear adhesion strength (MPa) | 13.8 | 9.9 | 13.6 | 8.3 | 13.6 | 15.5 | 15.2 | 13.0 | 14.5 |
| Failure mode | CF | CF | CF | CF | CF | CF | CF | CF | CF |
| Peel strength (N/25 mm) | 2.4 | 2.6 | 2.9 | 3.2 | 0.9 | 2.4 | 1.8 | 0.6 | 1.2 |
| Failure mode | CF50 | CF50 | CF50 | CF50 | AF | CF50 | CF50 | AF | AF |

The details of each component shown in Table 2 above are as follows.

Epoxy resin 1: Adeka Resin EP-4100 (manufactured by Adeka Corporation)

Thermoplastic resin of Synthesis Example 1: Thermoplastic resin of Synthesis Example 1 synthesized as described above Thermoplastic resin of Synthesis Example 2: Thermoplastic resin of Synthesis Example 2 synthesized as described above Thermoplastic resin of Synthesis Example 3: Thermoplastic resin of Synthesis Example 3 synthesized as described above Thermoplastic resin of Synthesis Example 4: Thermoplastic resin of Synthesis Example 4 synthesized as described above Thermoplastic resin of Synthesis Example 5: Thermoplastic resin of Synthesis Example 5 synthesized as described above Thermoplastic resin of Synthesis Example 6: Thermoplastic resin of Synthesis Example 6 synthesized as described above Unmodified thermoplastic resin 1: R15HT (polybutadiene polyol; manufactured by Idemitsu Kosan Co., Ltd.)

Unmodified thermoplastic resin 2: R45HT (polybutadiene polyol; manufactured by Idemitsu Kosan Co., Ltd.)

Heat reversible rubber Y1: Urethane resin (B)1 described in Patent Document 1

Curing agent 1: 4-methylimidazole

Curing agent 2: Dicyandiamide

Curing agent 3: Diaminodiphenylmethane

Commercially available adhesive: TB2088E (epoxy adhesive; manufactured by ThreeBond Co., Ltd.)

As is clear from the results shown in Table 2, Blending Examples 1, 2, 4, 5, 10, 12, 15, and 16 had the same or better heat resistance and tensile shear adhesion strength as well as improved peel strength compared to a reference of Blending Example 14 consisting of epoxy resin 1 and curing agent 1 without containing a thermoplastic resin.

In contrast, Blending Examples 3, 6, and 11 which used the thermoplastic resin of Synthesis Example 3 or 6 (modification rate: 10 mol %) had much lower heat resistance and lower tensile shear adhesion strength compared to the reference of Blending Example 14.

Furthermore, Blending Example 7 in which the blended content of the thermoplastic resin of Synthesis Example 2 was below the specified range had insufficient improvement of peel strength and had lower tensile shear adhesion strength compared to the reference of Blending Example 14.

Additionally, Blending Examples 8 and 9 which used unmodified thermoplastic resin 1 or 2 could not be advantageously used in applications such as adhesives because they did not exhibit any improvement in peel strength and had lower tensile shear adhesion strength compared to the reference of Blending Example 14, and had a failure mode of "AF."

Additionally, Blending Example 13 in which the blended content of the thermoplastic resin of Synthesis Example 2 was above the specified range had lower heat resistance and lower tensile shear adhesion strength compared to the reference of Blending Example 14.

Furthermore, Blending Example 17, which used conventional heat reversible rubber Y1 in combination with epoxy resin 1, and Blending Example 18, which used a commercially available adhesive, exhibited no improvement in peel strength.

What is claimed is:

1. A thermosetting resin composition comprising:
   an epoxy resin A containing two or more epoxy groups per molecule; and
   a thermoplastic resin B containing a functional group f having reactivity with the epoxy groups,
   the thermoplastic resin B being obtained by modifying a thermoplastic resin b1 containing an unsaturated bond with a nitrone b2 containing the functional group f, and a content of the nitrone b2 relative to the unsaturated bonds being not less than 0.5 mol % and less than 10 mol %, and
   a content of the thermoplastic resin B being from 10 to 50 parts by mass per 100 parts by mass of the epoxy resin A.

2. The thermosetting resin composition according to claim 1, wherein the functional group f is a nitrogen-containing group having reactivity with an epoxy group.

3. The thermosetting resin composition according to claim 2, wherein the functional group f which is the nitrogen-containing group is an imidazole residue.

4. The thermosetting resin composition according to claim 1, wherein the thermoplastic resin b1 is a diene rubber component.

5. The thermosetting resin composition according to claim 1, further comprising a curing agent C containing a functional group having reactivity with the epoxy groups.

6. The thermosetting resin composition according to claim 2, wherein the thermoplastic resin b1 is a diene rubber component.

7. The thermosetting resin composition according to claim 3, wherein the thermoplastic resin b1 is a diene rubber component.

8. The thermosetting resin composition according to claim 2, further comprising a curing agent C containing a functional group having reactivity with the epoxy groups.

9. The thermosetting resin composition according to claim 3, further comprising a curing agent C containing a functional group having reactivity with the epoxy groups.

10. The thermosetting resin composition according to claim 4, further comprising a curing agent C containing a functional group having reactivity with the epoxy groups.

11. The thermosetting resin composition according to claim 6, further comprising a curing agent C containing a functional group having reactivity with the epoxy groups.

12. The thermosetting resin composition according to claim 7, further comprising a curing agent C containing a functional group having reactivity with an epoxy group.

* * * * *